United States Patent
Chou

(10) Patent No.: US 8,421,876 B2
(45) Date of Patent: Apr. 16, 2013

(54) ELECTRONIC APPARATUS AND IMAGE CAPTURING DEVICE

(75) Inventor: Chan-Min Chou, New Taipei (TW)

(73) Assignee: Altek Corporation, Hsinchu (TW)

( * ) Notice: Subject to any disclaimer, the term of this patent is extended or adjusted under 35 U.S.C. 154(b) by 154 days.

(21) Appl. No.: 13/107,661

(22) Filed: May 13, 2011

(65) Prior Publication Data

US 2012/0188407 A1    Jul. 26, 2012

(30) Foreign Application Priority Data

Jan. 25, 2011    (TW) ............................ 100102570 A

(51) Int. Cl.
*H04N 5/228*    (2006.01)
(52) U.S. Cl.
USPC ........................................................ 348/222.1
(58) Field of Classification Search ................ 348/222.1
See application file for complete search history.

(56) References Cited

U.S. PATENT DOCUMENTS

| | | | | |
|---|---|---|---|---|
| 8,085,320 | B1 * | 12/2011 | Khan et al. ..................... | 348/241 |
| 8,169,527 | B2 * | 5/2012 | Yamaoka et al. ........ | 348/333.01 |
| 8,233,200 | B2 * | 7/2012 | Metayer et al. ............... | 358/474 |
| 8,310,550 | B2 * | 11/2012 | Hayasaki .................... | 348/207.2 |
| 2002/0075389 | A1 * | 6/2002 | Seeger et al. ................. | 348/222 |
| 2004/0156024 | A1 * | 8/2004 | Matsuda et al. ................ | 353/70 |
| 2005/0041217 | A1 * | 2/2005 | Tajima ............................ | 353/69 |
| 2009/0066811 | A1 * | 3/2009 | Maekawa .................... | 348/231.3 |
| 2010/0165104 | A1 * | 7/2010 | Fujita et al. ................... | 348/148 |
| 2011/0043667 | A1 * | 2/2011 | Kotani .......................... | 348/241 |

* cited by examiner

*Primary Examiner* — James Hannett
(74) *Attorney, Agent, or Firm* — Wang Law Firm, Inc.; Li K. Wang; Stephen Hsu

(57) ABSTRACT

An electronic apparatus and an image capturing apparatus are provided. The image capturing apparatus comprises an image capturing module and a processing module. The image capturing module captures an image having a plurality of pixels. The processing module looks up a table to process a rotation calibration or a tilt calibration toward the pixels to output a calibrated image.

10 Claims, 7 Drawing Sheets

ELECTRONIC APPARATUS AND IMAGE CAPTURING DEVICE

BACKGROUND OF THE INVENTION

1. Field of the Invention

The present invention relates to an electronic apparatus and an image capturing apparatus, and more particularly to the electronic apparatus, the image capturing apparatus capable of calibrating image distortion caused by error while installing a photosensitive component.

2. Description of the Related Art

Currently, a primary image capturing apparatus, such as a digital camera cell phone, a digital camera, a digital video camera, etc., usually has a function of capturing static images to allow a user to record desired images anytime. The apparatus becomes a very important and indispensable function in the known image capturing apparatus.

However, these image capturing apparatuses may easily have tiny tolerance problem due to the size difference between hardware after installing said hardware. Although these tiny differences may not seriously cause defective goods, these tiny tolerances may cause obvious offsets on taken images to seriously influence the user.

In the past, the influence caused by installing the hardware usually uses mechanical manner to reinstall the hardware to overcome the problem if the tolerance is extremely great. However, the tiny tolerance may not merely rely on mechanical installation to completely overcome the problem. Moreover, it may consume much labor and time with respect to mechanical installation. Consequently, it is a worse practice to production companies.

Therefore, how to thoroughly improve the foregoing issue through computer executable software such that the tiny tolerance existing in the image capturing apparatus can be overcome to allow these images taken by the image capturing apparatus to be completely identical to taken image objects. Further, the user can actually enjoy the real function of the image capturing apparatus. Therefore, all companies who currently deal with the production of the image capturing apparatus must pay attention to the foregoing shortcomings. Since the image capturing apparatus gradually becomes main stream, using excellent products to take competition advantage is valuable to these companies.

SUMMARY OF THE INVENTION

In view of the shortcomings of the prior art, the inventor(s) of the present invention based on years of experience in the related industry to conduct extensive researches and experiments, and finally developed an electronic apparatus and an image capturing apparatus, as a principle objective so that an obvious offset caused on captured images due to tiny installation tolerance can be overcome.

To achieve the foregoing objective, the electronic apparatus of the invention comprises an input module, a storing module, an image capturing module, a processing module and a display module. The input module provides an operating instruction after receiving operation. The storing module stores a look-up table. The image capturing module captures an image. The image comprises a plurality of pixels. The processing module controls the image capturing module to capture the image based upon the operating instruction and performs a rotation calibration and a tilt calibration to output a calibrated image after further searching the look-up table. The display module displays the calibrated image.

The processing module performs the rotation calibration for the pixels through pixel mapping, interpolation or extrapolation.

The tilt calibration comprises a focusing calibration and a trapezoid calibration.

The processing module performs the focusing calibration for the pixels through a sharpness manner.

The processing module performs the trapezoid calibration for the pixels through pixel mapping, interpolation or extrapolation.

The look-up table comprises a corresponding relationship of position coordinates for each pixel before calibration or after calibration.

To achieve the foregoing objective, the image capturing apparatus is further provided and comprises a storing module, an image capturing module and a processing module. The storing module stores a look-up table. The image capturing module captures an image. The image comprises a plurality of pixels.

The processing module performs a rotation calibration and a tilt calibration to output a calibrated image after further searching the look-up table.

The processing module performs the rotation calibration for the pixel through pixel mapping, interpolation or extrapolation.

The tilt calibration comprises a focusing calibration and a trapezoid calibration.

The processing module performs the focusing calibration for the pixels through a sharpness manner.

The processing module performs the trapezoid calibration for the pixels through pixel mapping, interpolation or extrapolation.

The look-up table comprises a corresponding relationship of position coordinates for each pixel before calibration or after calibration.

To achieve the foregoing object, the image capturing apparatus is further provided and comprises means for storing a look-up table, means for capturing an image, wherein the image comprises a plurality of pixels, and means for performing a rotation calibration and a tilt calibration for the plurality of pixels to output a calibrated image after searching the look-up table.

The rotation calibration for the pixels is performed by pixel mapping, interpolation or extrapolation.

The tilt calibration comprises a focusing calibration and a trapezoid calibration.

The focusing calibration for the pixels is performed by a sharpness manner.

The trapezoid calibration for the pixels is performed by pixel mapping, interpolation or extrapolation.

The look-up table comprises a corresponding relationship of position coordinates for each pixel before calibration or after calibration.

The electronic apparatus and the image capturing apparatus in accordance with the invention have one or more advantages as the following:

(1) The electronic apparatus and the image capturing apparatus can simultaneously perform the rotation calibration and/or tilt calibration for the captured image to enhance the efficiency of image calibration.

(2) The electronic apparatus and the image capturing apparatus can perform the subsequent image calibration by a pre-stored look-up table containing pixel corresponding coordinates with respect to the rotation calibration and the tilt calibration. Accordingly, the problems of image distortion, scale error or out of focus on the photosensitive component due to installation tolerance can be overcome.

DETAILED DESCRIPTION OF THE PREFERRED EMBODIMENTS

The foregoing and other technical characteristics of the present invention will become apparent with the detailed description of the preferred embodiments and the illustration of the related drawings.

Figure 1:
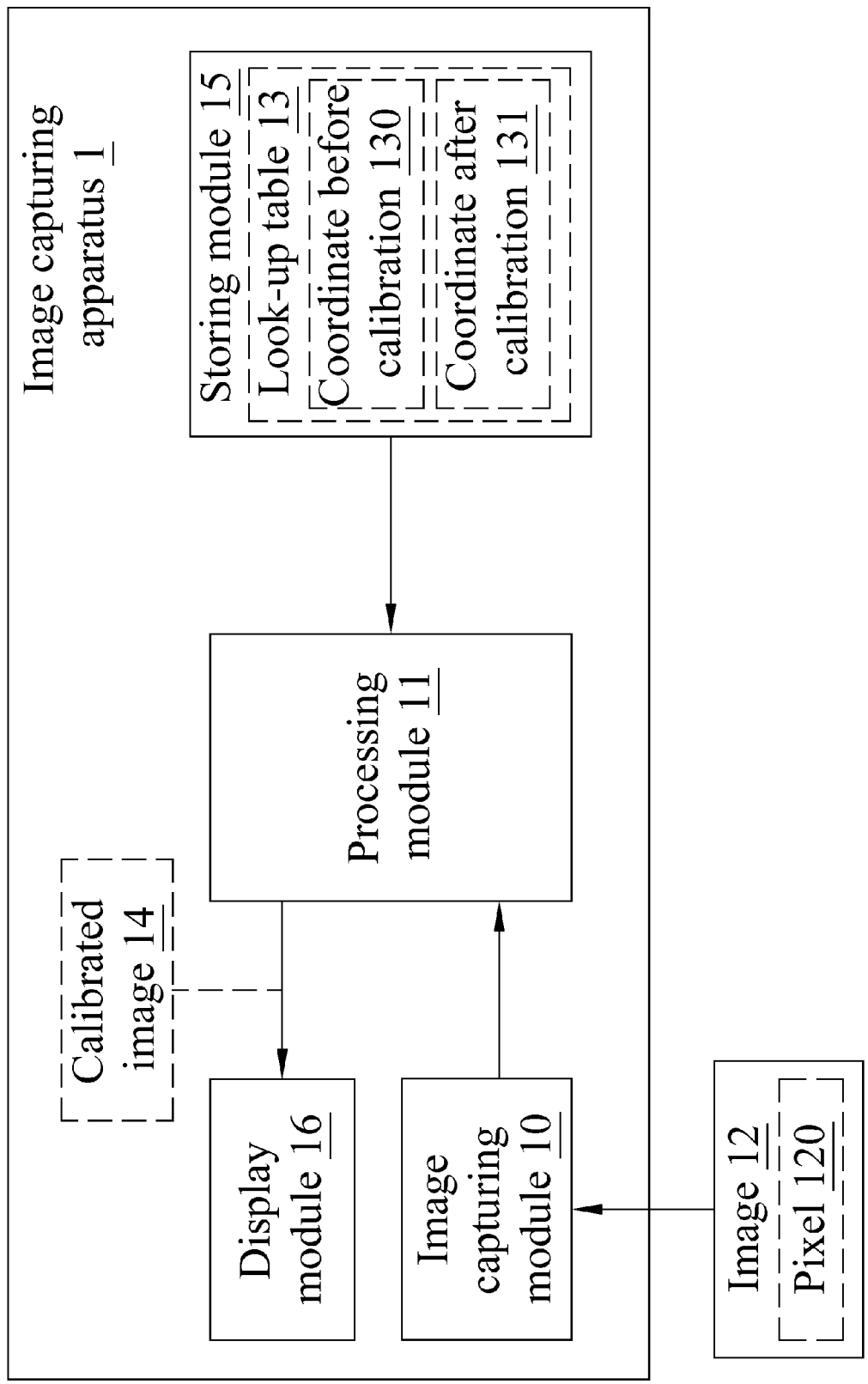
FIG. 1 is a block diagram of an image capturing apparatus according to the present invention.

With reference to FIG. 1 for a block diagram of an image capturing apparatus in accordance with the present invention is depicted. The image capturing apparatus 1 of the invention comprises an image capturing module 10, a processing module 11, a storing module 15 and a display module 16. In some preferred embodiments, the image capturing module 10 comprises at least one photosensitive component such as a complementary metal-oxide-semiconductor (CMOS) or a charge-coupled-device (CCD), a lens and a lens set. The storing module 15 can be an embedded memory, an external memory card or combination thereof. The processing module 11 is electrically connected to the image capturing module 10, the storing module 15 and the display module 16 and can be a central processing unit (CPU) or a micro-processing unit (MPU). In some preferred embodiments, the image capturing apparatus 1 of the invention can be a digital camera or a digital video camera.

The image capturing module 10 captures an image 12. The image 12 comprises a plurality of pixels 120. The processing module 11 performs the rotation calibration or tilt calibration for these pixels 120 after searching a look-up table 13. A calibrated image 14 is outputted to the display module 16 for displaying. The look-up table 13 is stored in the storing module 15. The look-up table 13 comprises at least one coordinate before calibration 130 and at least one coordinate after calibration 131 corresponding to each pixel 120. Besides, all those skilled in the art may randomly combine the functional modules into an integrated means or divide them into each detailed functional means, depending on the convenience of design.

Figure 2:
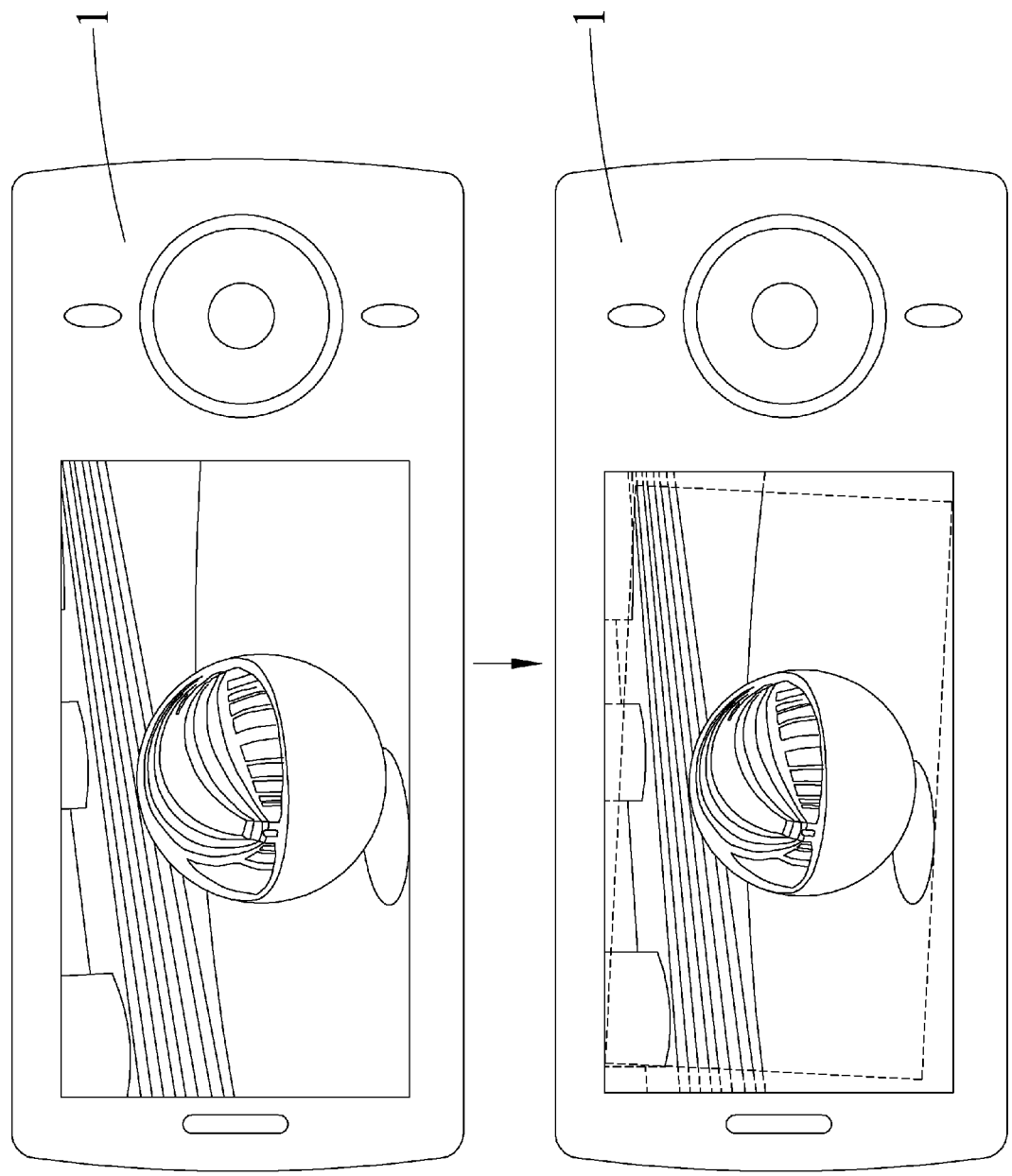
FIG. 2 is a schematic diagram of an image capturing apparatus according to a first embodiment of the present invention.

With reference to FIG. 2 for a schematic diagram of an image capturing apparatus in accordance with a first embodiment of the invention is depicted. In the embodiment, the processing module 11 performs the rotation calibration for these pixels 120 after searching a look-up table 13. The rotation calibration is to calibrate the rotated error generated by installing the photosensitive components. With reference to Table 1 for the embodiment of the foregoing look-up table 13 is depicted.

TABLE 1

Look-up table

| Pixel coordinate before rotation calibration | Pixel coordinate after rotation calibration | Pixel coordinate before tilt calibration | Pixel coordinate after tilt calibration |
|---|---|---|---|
| (0, 0) | (0, 0) | (0, 2) | (0, 0) |
| . | . | . | . |
| . | . | . | . |
| . | . | . | . |
| (510, 383) | (512, 384) | (512, 383) | (512, 384) |
| . | . | . | . |
| . | . | . | . |
| . | . | . | . |
| Non | (1024, 768) | (1024, 790) | (1024, 768) |

Since the photosensitive components would generate an angle having rotation deviation with respect to the lens or the whole image capturing apparatus 1 during the installation, an angle may deviate with a normal level when the imaging is performed as shown the foregoing figure. Accordingly, the invention analyzes the rotating angles required for each pixel under each resolution. The rotated angle can be provided to an accurate checkerboard image in advance, and the image capturing apparatus 1 is utilized to take another checkerboard image. The processing module 11 then performs point-to-point comparison between each pixel in the taken checkerboard image and each pixel in the accurate checkerboard image so as to obtain coordinate calibration value required for calibrating each pixel. When a user uses the image capturing apparatus 1 of the invention to take pictures, the processing module 11 can perform the rotation calibration for the pixels 120 after searching the look-up table 13. Vacant pixel positions, which are rotated, can be compensated by the processing module 11 with pixel mapping, interpolation or extrapolation, thereby retaining the completeness of frames.

In some preferred embodiments, if the pixels coordinate before performing the rotation calibration is (510, 383), the pixels can be rotated to (512, 38 ) position according to the foregoing manners. Further, the pixels at (1024, 768) of final calibration image coordinate are pixels lacked by originally images before calibration. Therefore, the pixels at (1024, 768) of final calibration image coordinate are generated by interpolation or extrapolation rather than calibrating with pixel mapping. Actual calibrated images can refer to the lower part of the figure, wherein the image inside the dashed lines represents the image before calibration. In other words, pixels outside of the dashed lines are compensated by pixel mapping, interpolation or extrapolation.

Figure 3:
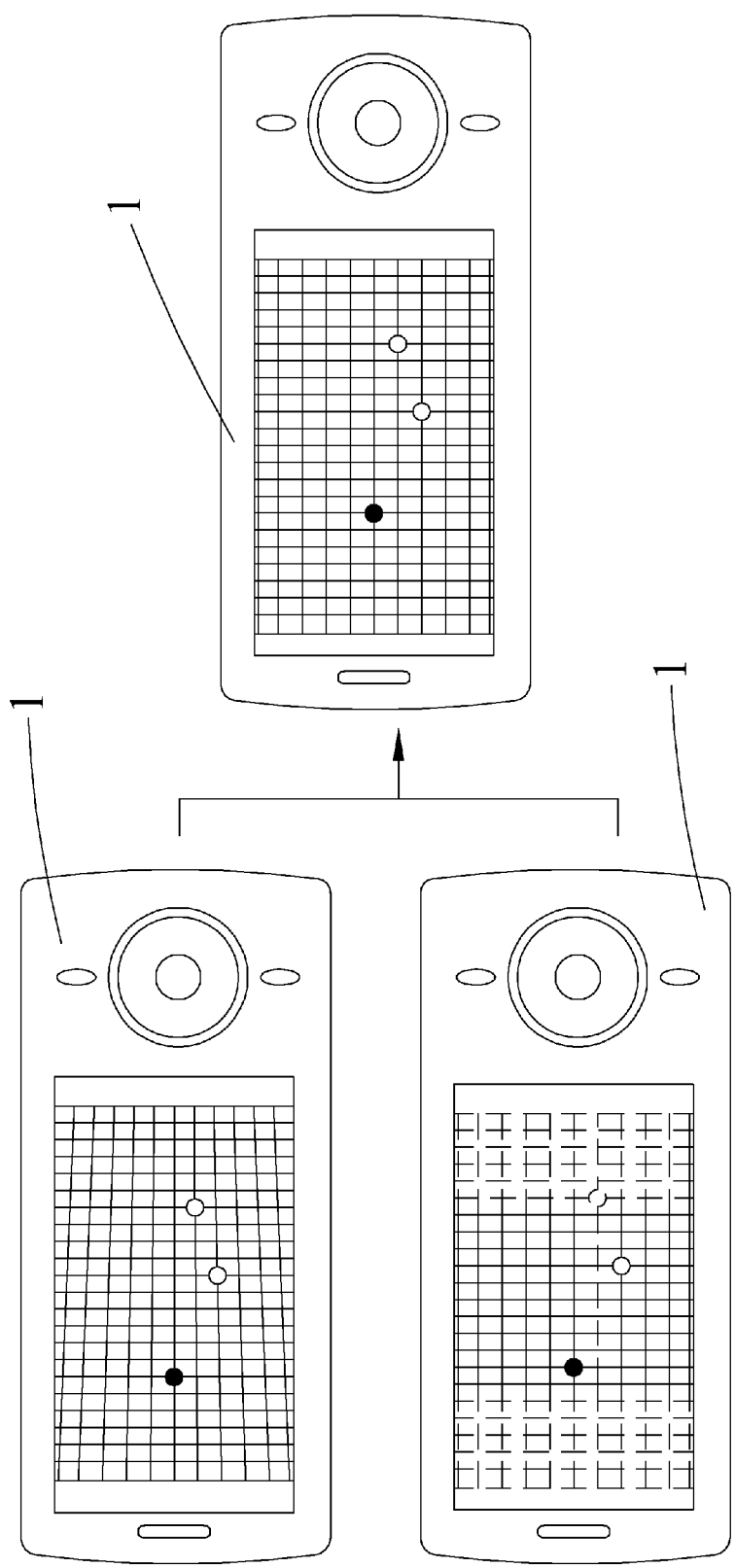
FIG. 3 is a schematic diagram of an image capturing apparatus according to a second embodiment of the present invention.

With reference to FIG. 3 for a schematic diagram of an image capturing apparatus in accordance with a second embodiment of the invention is depicted. The processing module 11 performs the tilt calibration for these pixels 120 after searching the look-up table 13. The tilt calibration is to calibrate the tilt error generated by installing the photosensitive components. During the installation, the photosensitive components may not have the same height with the lens or the whole image capturing apparatus 1 in the vertical direction. For example, the left side of the photosensitive components has higher vertical height than the right side, and images on right and left sides of a frame may generate non-identical scale (as shown in the upper-left part of the figure). Alternatively, the images on right and left sides of the frame may be blurrier than the images at the central area (as shown in the lower-left part of the figure). Therefore, the processing module 11 can obtain the calibration value (a coordinate transformation relationship between pixel coordinates of accurate images and pixel coordinates of captured images) for the tilt error generated by installing the photosensitive components by using the foregoing manner depicted in the first embodiment. The captured images can also be calibrated by pixel mapping, interpolation or extrapolation (as shown in right side of the figure), thereby forming the trapezoid calibration.

With reference to Table 1, while actually establishing the coordinate corresponding relationship of trapezoid calibration, the processing module 11 compares pixels in the accurate checkerboard image with each pixel in the checkerboard image captured by the image capturing apparatus 1 through the foregoing point-to-point comparison manner. For example, the pixel coordinate (1024, 790) of captured images is the position of pixel coordinate (1024, 768) of the accurate image after comparison. At this time, the processing module records the corresponding relationship in the look-up table and sets up the complete look-up table after repeatedly comparing each pixel. If some pixels still have omission after comparison, the compensation can be performed by interpolation or extrapolation to retain the completeness of frames. Accordingly, the processing module 11 can perform trapezoid calibration for the images captured by the image capturing apparatus 1 according to the corresponding relationship of each pixel coordinate in the look-up table.

In addition, the processing module 11 can further perform focusing calibration for captured images except for trapezoid calibration. Since the photosensitive components may not have the same height with the lens or the whole image capturing apparatus 1 in the vertical direction during the installation, for example, the left side of the photosensitive components has higher vertical height than the right side, the focusing condition of left and right sides of the image is worse than the central portion of the image. The processing module 11 further analyzes focus and non-focus areas of the captured image and performs sharpness process for the image within the non-focus area so as to execute the focusing calibration of the tilt calibration. The calibration of lower-left part in the figure is shown at right side of the figure. It should be noted that trapezoid calibration and focusing calibration in the tilt calibration are, but do not limit, individually performed or integrally performed.

Figure 4:
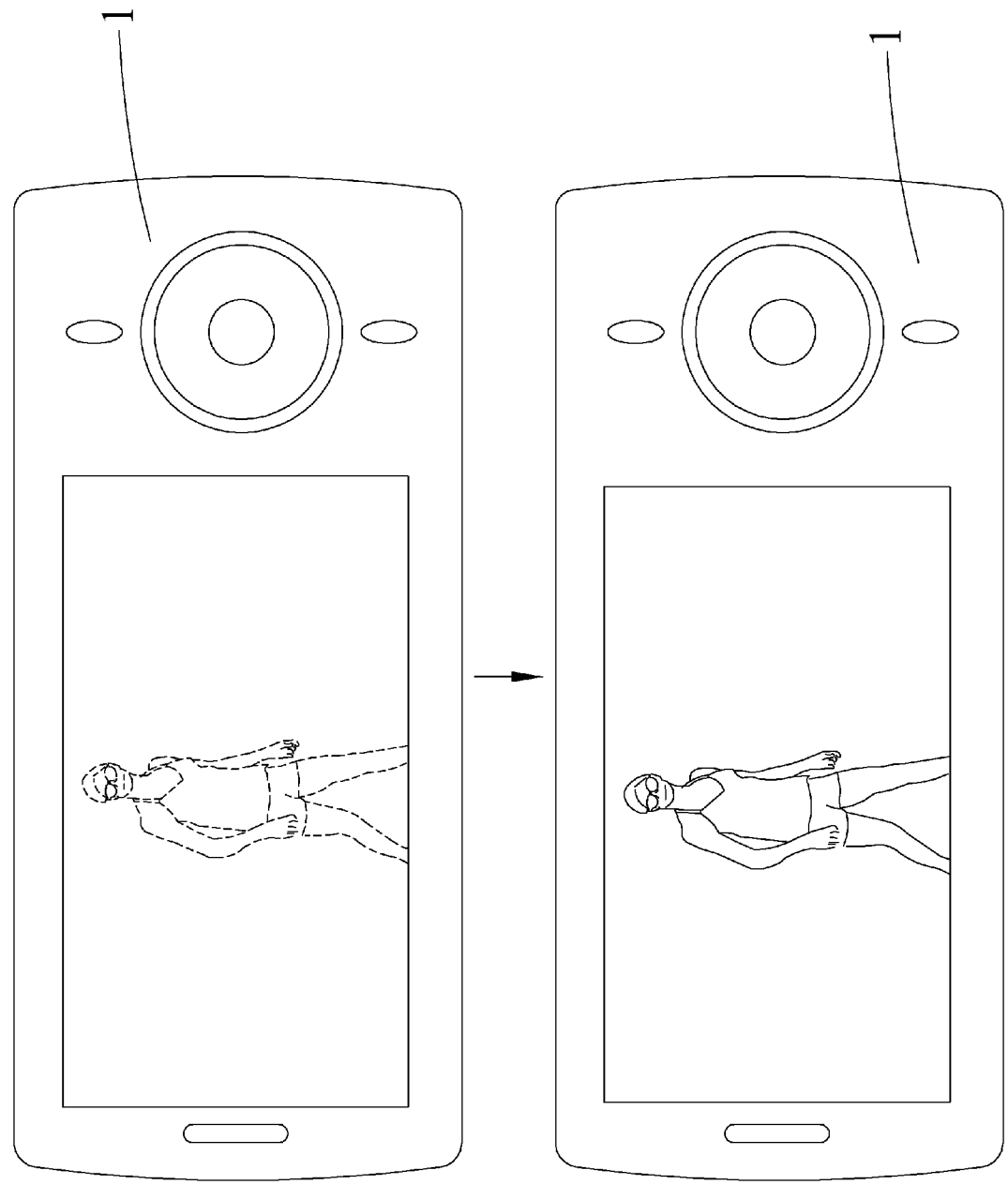
FIG. 4 is a schematic diagram of an image capturing apparatus according to a third embodiment of the present invention.

With reference to FIG. 4 for a schematic diagram of an image capturing apparatus in accordance with a third embodiment of the invention is depicted. In the embodiment, the processing module 11 performs another focusing calibration for the pixels 120. The focusing calibration is to calibrate the focusing error generated by installing the photosensitive component. The photosensitive components may have vertical installed error, which shows that it is not on the focal point, with the lens in the vertical direction during the installation. In other words, a distance is forwardly or backwardly shifted from the focal point. According, since there is no other error, the whole frame may not be focused (as shown in the upper portion of the figure). The processing module 11 obtains the focusing error of the photosensitive component through the manner depicted in the first embodiment and calibrates the captured image through sharpness manner so that the whole captured image can be calibrated to form the calibrated image shown in the lower portion of the figure.

It should be noted that image capturing apparatus 1 disclosed by the invention does not only calibrate the foregoing errors, but also calibrates the errors by simultaneously searching the look-up table 13 so as to reduce the calculation. The image processing speed can also be increased to improve the rate of continuously taking pictures.

Figure 5:
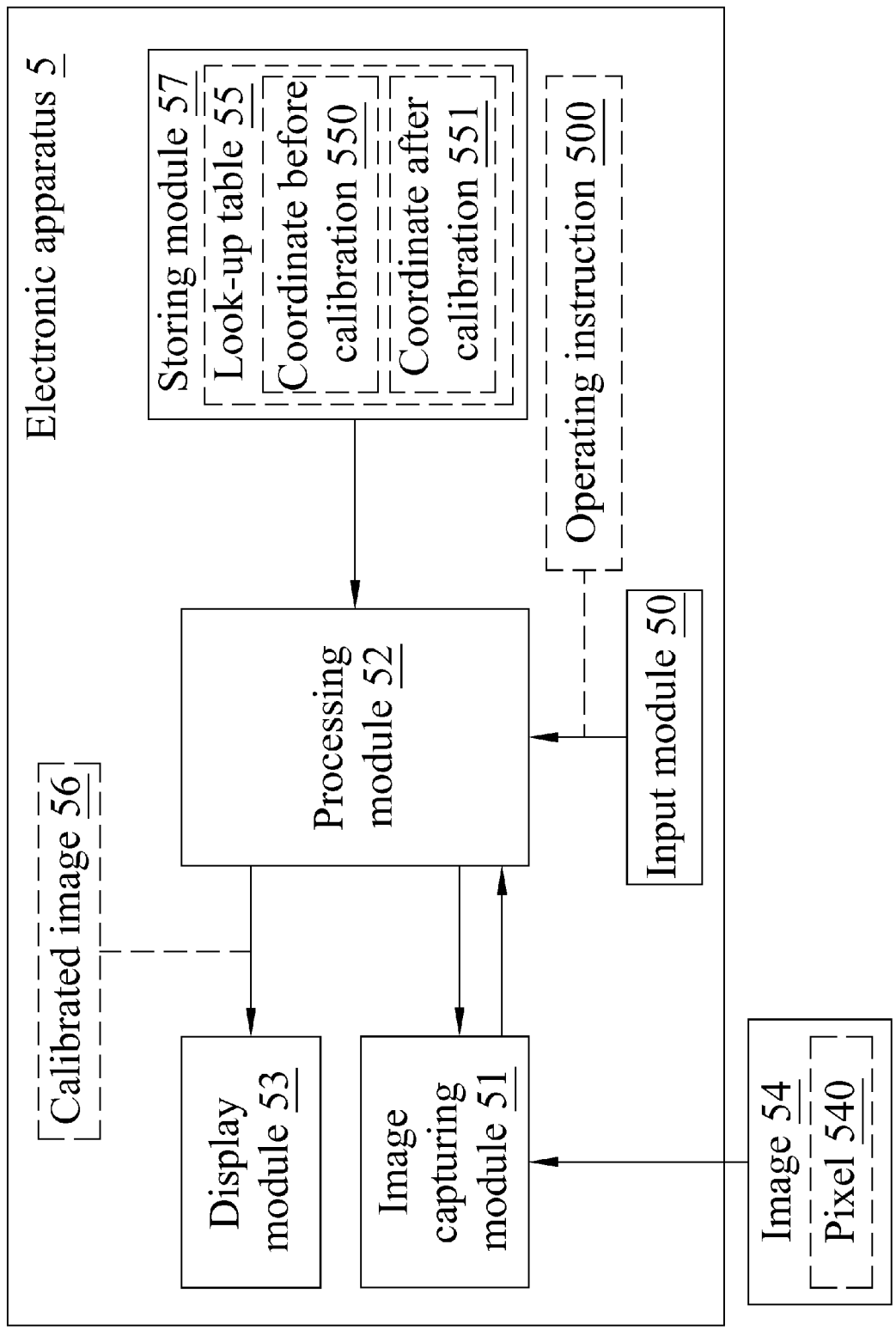
FIG. 5 is a block diagram of an electronic apparatus according to the present invention.
Figure 6:
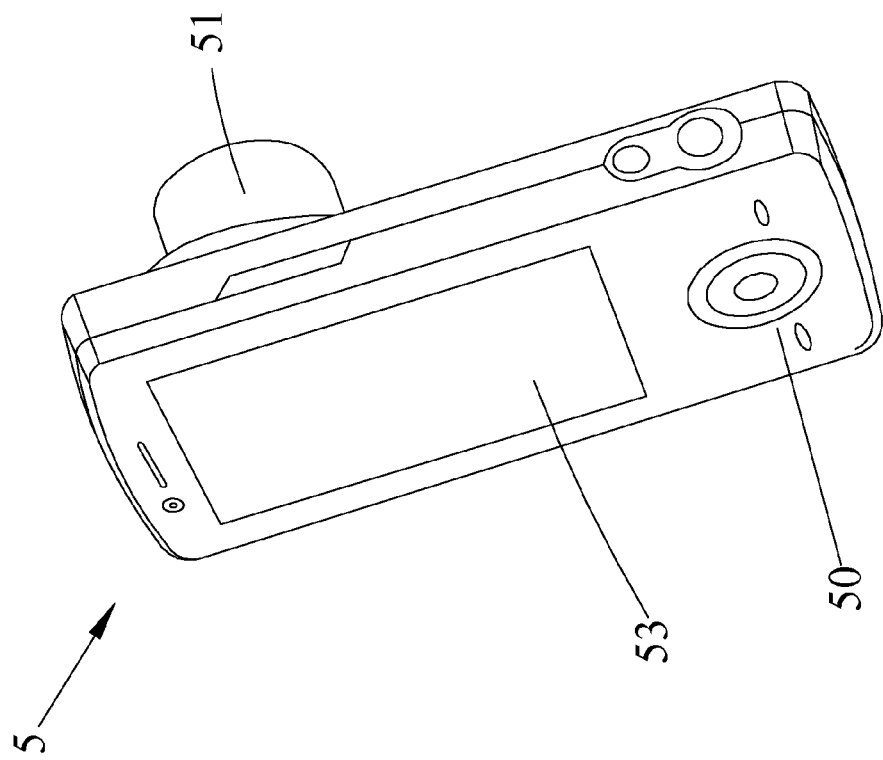
FIG. 6 is a schematic diagram of an electronic apparatus according to an embodiment of the present invention.

With reference to FIG. 5 and FIG. 6 for a block diagram and a schematic diagram of electronic apparatus in accordance with an embodiment of the invention are depicted. The electronic apparatus 5 of the invention comprises an input module 50, an image capturing module 51, a processing module 52, a display module 53 and a storing module 57. The input module 50 provides an operating instruction 500 after receiving operation. The image capturing module 51 captures an image 54. The image 54 comprises a plurality of pixels 540. The processing module 52 controls the image capturing module 51 to capture the image 54 based upon the operating instruction 500 and performs the rotation calibration or tilt calibration for the pixels 540 after further searching the look-up table 55 stored in the storing module 57. A calibrated image 56 then is provided. The display module 53 displays the calibrated image 56. The image calibration performed by the electronic apparatus 5 of the invention has been described in the part of the image capturing apparatus 1, and there is no need to describe herein again.

In the embodiment, the electronic apparatus 5 takes an intelligent mobile phone as an instance. Its display module 53 and the input module 50 can be integrated into a touch screen. In addition, a person having ordinary skill in the art of the invention can use a mobile phone or an intelligent mobile phone having photographing function, a personal digital assistant having photographing function, a navigator having photographing function or a tablet computer or a laptop computer having photographing function to perform the spirit of the invention.

In the process of depicting the image capturing apparatus of the invention, a concept of the procedure of the image capturing apparatus capturing images has been simultaneously described. However, the following flowchart is further provided to clearly describe the procedure of the image capturing apparatus capturing images.

Figure 7:
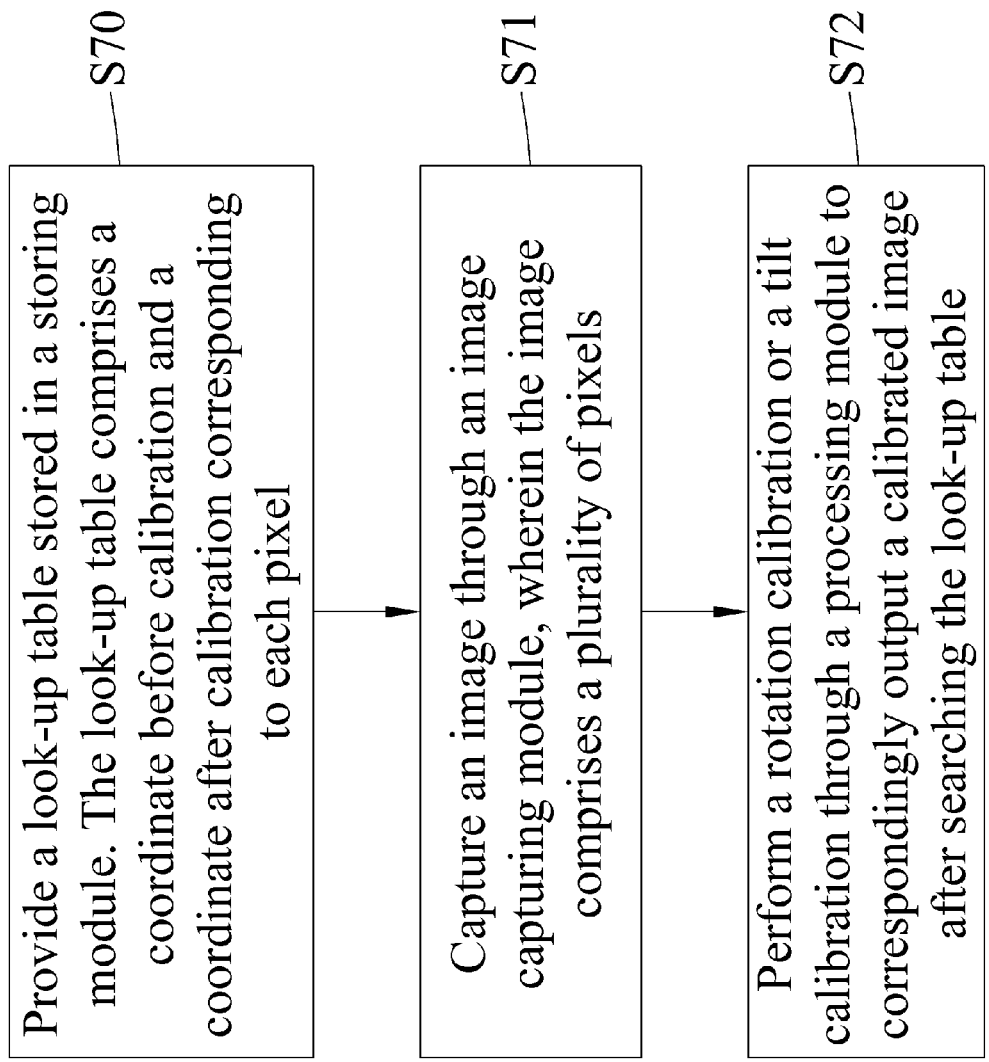
FIG. 7 is a flowchart of an image capturing apparatus capturing images according to the present invention.

With reference to FIG. 7 for a flowchart of the image capturing apparatus capturing images in accordance with the invention is depicted. The procedure of the image capturing apparatus capturing images comprises the following steps:

S70: Provide a look-up table stored in a storing module. The look-up table comprises a coordinate before calibration and a coordinate after calibration corresponding to each pixel;

S71: Capture an image through an image capturing module, wherein the image comprises a plurality of pixels; and S72: Perform a rotation calibration or a tilt calibration through a processing module to correspondingly output a calibrated image after searching the look-up table.

The detail explanation and the embodiment of the procedure of the image capturing apparatus capturing images have been described in the image capturing apparatus of the invention, and there is no need to describe herein again.

The electronic apparatus and the image capturing apparatus of the invention can perform the calibration for captured images by data, which contains rotation calibration, tilt calibration and focusing calibration, stored in the look-up table.

Accordingly, the problems of distortion, scale error or out of focus on the photosensitive component due to installation tolerances can be overcome. Further, the rotation calibration, tilt calibration and focusing calibration can also be simultaneously performed for the captured images so as to enhance the efficiency of image calibration.

The invention improves over the prior art and complies with patent application requirements, and thus is duly filed for patent application. While the invention has been described by device of specific embodiments, numerous modifications and variations could be made thereto by those generally skilled in the art without departing from the scope and spirit of the invention set forth in the claims.

What is claimed is:

1. An image capturing apparatus comprising:
a storing module, storing a look-up table;
an image capturing module, capturing an image, the image comprising a plurality of pixels; and
a processing module, performing a rotation calibration and a tilt calibration for the plurality of pixels to output a calibrated image after searching the look-up table;
wherein, the tilt calibration comprises a focusing calibration and a trapezoid calibration, and the processing module performs the focusing calibration for the pixels by a sharpness manner, and performs the trapezoid calibration for the pixels by pixel mapping, interpolation or extrapolation.

2. The image capturing apparatus as recited in claim 1, wherein the processing module performs the rotation calibration for the pixels through pixel mapping, interpolation or extrapolation, and the look-up table comprises a corresponding relationship of position coordinate for each pixel before calibration or after calibration.

3. The image capturing apparatus as recited in claim 1, wherein the look-up table comprises a corresponding relationship of position coordinate for each pixel before calibration or after calibration.

4. An image capturing apparatus comprising:
means for storing a look-up table;
means for capturing an image, the image comprising a plurality of pixels; and
means for performing a rotation calibration and a tilt calibration for the plurality of pixels to output a calibrated image after searching the look-up table;
wherein the rotation calibration for the pixels by pixel mapping, interpolation or extrapolation, and the look-up table comprises a corresponding relationship of position coordinate for each pixel before calibration or after calibration; the tilt calibration comprises a focusing calibration and a trapezoid calibration, and the focusing calibration for the pixels is performed by a sharpness manner, and the trapezoid calibration for the pixels is performed by pixel mapping, interpolation or extrapolation.

5. An electronic apparatus comprising:
an input module, providing an operating instruction after receiving an operation;
a storing module, storing a look-up table;
an image capturing module, capturing an image, the image comprising a plurality of pixels; and
a processing module, controlling the image capturing module to capture the image based upon the operating instruction and for performing a rotation calibration or a tilt calibration to output a calibrated image after searching the loop-up table; and
a display module for displaying the calibrated image;
wherein the tilt calibration comprises a focusing calibration and a trapezoid calibration.

6. The electronic apparatus as recited in claim 5, wherein the processing module performs the rotation calibration for the pixels through pixel mapping, interpolation or extrapolation.

7. The electronic apparatus as recited in claim 6, wherein the look-up table comprises a corresponding relationship of position coordinate for each pixel before calibration or after calibration.

8. The electronic apparatus as recited in claim 5, wherein the processing module performs the focusing calibration for the pixels through a sharpness manner.

9. The electronic apparatus as recited in claim 5, wherein the processing module performs the trapezoid calibration for the pixels through pixel mapping, interpolation or extrapolation.

10. The electronic apparatus as recited in claim 9, wherein the look-up table comprises a corresponding relationship of position coordinate for each pixel before calibration or after calibration.

* * * * *